W. H. Paige,
Hose Coupling.
N°79,592. Patented July 7, 1868.
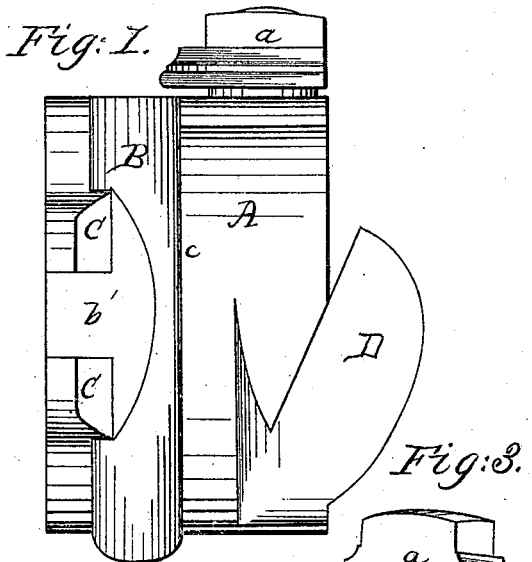
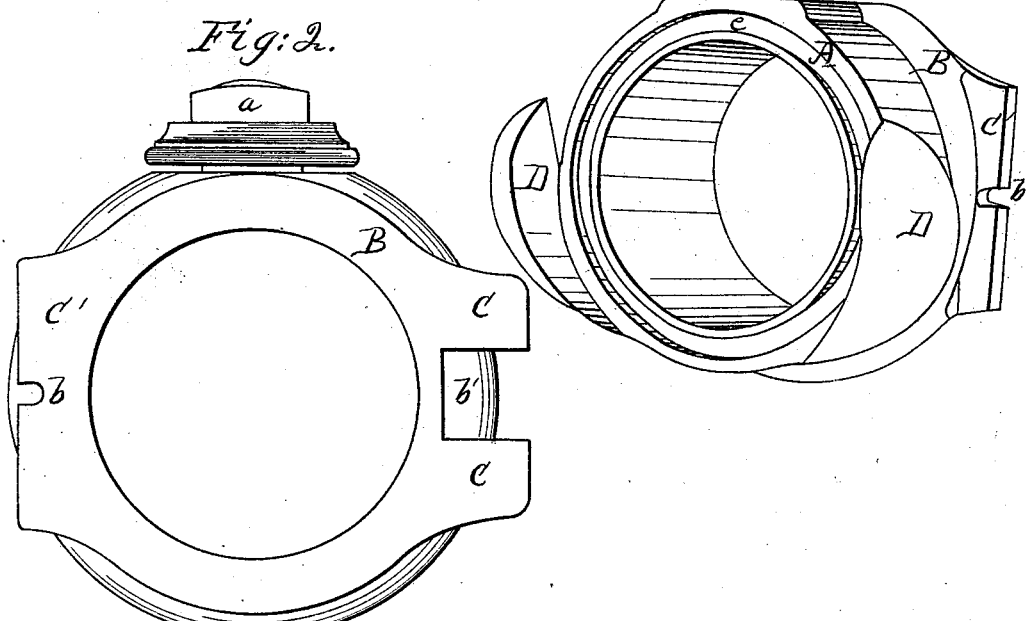
Witnesses.
F. E. Rice
T. A. Curtis
Inventor:
W. H. Paige

United States Patent Office.

W. H. PAIGE, OF SPRINGFIELD, MASSACHUSETTS, ASSIGNOR TO HIMSELF AND L. O. HANSON, OF SAME PLACE.

*Letters Patent No. 79,592, dated July 7, 1868.*

IMPROVEMENT IN DEVICES FOR CONNECTING DISSIMILAR HOSE-COUPLINGS.

*The Schedule referred to in these Letters Patent and making part of the same.*

TO ALL WHOM IT MAY CONCERN:

Be it known that I, W. H. PAIGE, of Springfield, in the county of Hampden, and Commonwealth of Massachusetts, have invented a new and useful Hose-Coupling Connection; and I do hereby declare that the following is a full, clear, and exact description thereof, reference being had to the accompanying drawings, making a part of this specification, and to the letters of reference marked thereon, in which—

Figure 1 represents a side elevation of one modification of my invention.

Figure 2 is an end elevation of the same, and

Figure 3 is a perspective view of the same.

My invention relates more particularly to that class of hose-coupling known as the universal coupling, for which device Letters Patent were granted to Duane T. Perkins and C. F. Hovey, and dated respectively September 10, 1867, and December 31, 1867, and it consists in the arrangement and construction of a connecting piece or coupling, whereby a line of hose furnished with the above-mentioned universal coupling, may be easily and quickly connected to another line of hose furnished with any of the other known couplings in use.

As the device known as the universal coupling becomes more introduced into the fire-departments of the different cities, and also into the large manufacturing-establishments throughout the country, it becomes a matter of necessity to devise some means whereby the hose, which is furnished with the said universal coupling, may be conveniently used in connection with that which may be provided with any of the known couplings which the corporations or manufactories may have been using previously, as it may be impossible in the large cities to make the whole change at once from the old coupling which they may have been using to the universal coupling which they may be desirous of introducing. And again, in both corporations and manufactories it may be desirable to discard only a portion of the old coupling which may be in use, and only partially adopt the new universal coupling, in order that its merits may be more thoroughly tested before its full and final adoption by such corporation or manufacturing company.

In order, then, to furnish a means whereby any coupling already in use may be successfully used in connection with the new universal coupling being introduced, I use a device, which, that others skilled in the art may be able to make and use, I will proceed to describe.

In the drawings—

The part A, which is upon one side of the line c, represents one-half of the universal coupling referred to, having the ears or lugs D D, the channel e for the water-packing, and the stud or pin s, upon which is secured the nut a, turning in a thread which is cut upon said stud or pin s.

The part B, which is upon the other side of the line c, represents one portion of a coupling, known as the "Gaylord" coupling, for which Letters Patent were granted to L. M. Ferry, assignor to J. T. Ames, and dated October 7, 1856, and reissued May 21, 1861. These I arrange together and construct in one piece, as shown in in elevation in fig. 1. Its operation is as follows:

If it is desired to connect two lines of hose, one line being provided with the coupling corresponding to the part A, the other line being provided with a coupling corresponding to the part B, the whole connection, as represented in fig. 1, is placed between the two lines of hose, and the part B is connected to its corresponding coupling on one line of hose, and the part A is connected to its corresponding part of the universal coupling upon the other line of hose. After the part B shall have been once connected, it is unnecessary to disconnect it in the ordinary use of the hose, but the hose may be used by locking and unlocking the part A from its corresponding portion or counterpart upon the hose, as the universal coupling is much more easily operated than any other.

It is evident that the part A remaining the same, one-half or portion of any other known coupling which may be in use at the time, may be substituted for the part B, so that hose provided with any description of coupling may be conveniently used in immediate connection with the universal coupling, by means of my coupling-connection, it being only necessary to make a pattern for casting, with the necessary change in the part B, and I do not therefore limit myself to the particular kind of coupling upon the part B, as the proper part of any other coupling would render the whole connection equally operative.

I do not claim either the part B or the part A, when considered separately or independently, nor do I claim any other hose-coupling when considered by itself as a perfect hose coupling; nor is it essential that I should limit myself to the universal hose-coupling herein referred to, though that is assumed to be the best in illustration, as tending to become the most generally used. In other words, it will be perceived that my invention is not a hose-coupling, but a bond between hose-couplings of any of the different kinds of construction, which may not be connected directly with each other.

I therefore claim—

A connection for hose-couplings, said connection consisting of a tube, terminating at its ends in devices corresponding with and adapted for attachment to dissimilar hose-couplings or connecting-devices, substantially as described.

W. H. PAIGE.

Witnesses:
F. E. RICE,
T. A. CURTIS.